United States Patent
Izumi

(10) Patent No.: US 8,094,541 B2
(45) Date of Patent: Jan. 10, 2012

(54) OPTICAL PICKUP AND OPTICAL DISC APPARATUS

(75) Inventor: Katsuhiko Izumi, Kamakura (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 399 days.

(21) Appl. No.: 12/036,335

(22) Filed: Feb. 25, 2008

(65) Prior Publication Data

US 2008/0298210 A1 Dec. 4, 2008

(30) Foreign Application Priority Data

Jun. 1, 2007 (JP) ................. 2007-146430

(51) Int. Cl.
*G11B 7/00* (2006.01)
(52) U.S. Cl. ............ 369/112.06; 369/94; 369/112.02
(58) Field of Classification Search .......... None
See application file for complete search history.

(56) References Cited

U.S. PATENT DOCUMENTS

| 6,487,160 | B1 * | 11/2002 | Iida et al. | 369/112.02 |
| 7,660,226 | B2 * | 2/2010 | Ogata | 369/112.18 |
| 2005/0083813 | A1 * | 4/2005 | Ogasawara | 369/53.2 |
| 2006/0002247 | A1 | 1/2006 | Kim et al. | |

FOREIGN PATENT DOCUMENTS

| JP | 10-269587 | 10/1998 |
| JP | 2006-24351 | 1/2006 |
| JP | 2006-54006 | 2/2006 |
| JP | 2006-268899 | 10/2006 |
| JP | 2007-18566 | 1/2007 |
| JP | 2007018566 A * | 1/2007 |

* cited by examiner

*Primary Examiner* — Joseph Haley
(74) *Attorney, Agent, or Firm* — Antonelli, Terry, Stout & Kraus, LLP.

(57) ABSTRACT

An optical pickup free from tracking error signal variation when playing back a double-layered disc, and coping with incompatible optical discs, such as BDs and HD DVDs, includes a laser light source, a first polarization rotation element for rotating a polarization direction of an optical beam from the source, an optical branching element disposed in a position after the polarization rotation element to reflect or transmit an optical beam according to polarization of the beam, first and second object lenses for focusing the reflected and transmitted optical beams onto first and second optical discs, respectively, a photodetector for sensing reflected light from the first and second optical discs, and a second polarization rotation element disposed after reflection or transmission of the reflected light from the first and second optical discs conducted by the branching element, to rotate a polarization direction of the reflected light.

6 Claims, 14 Drawing Sheets

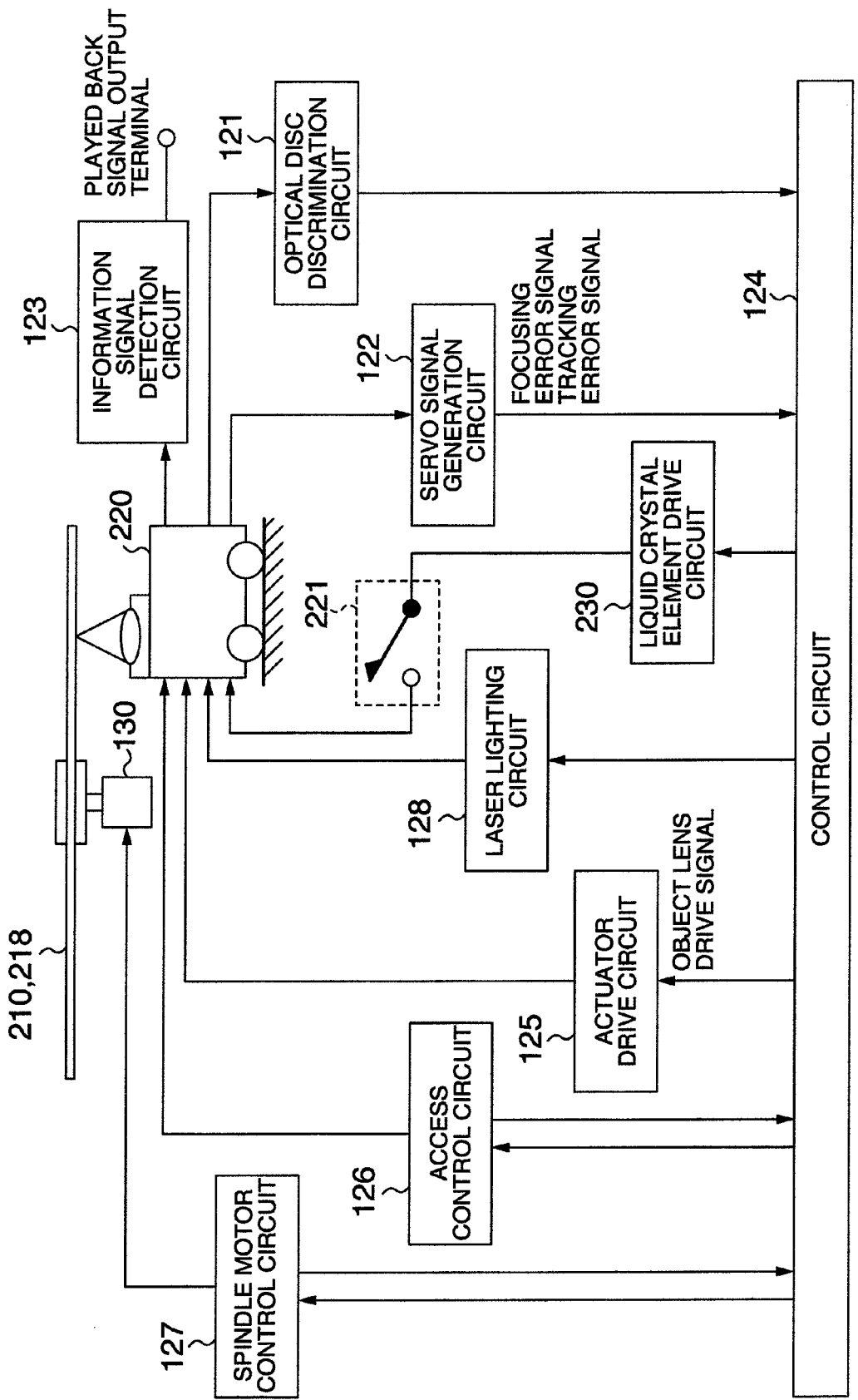

OPTICAL PICKUP AND OPTICAL DISC APPARATUS

INCORPORATION BY REFERENCE

The present application claims priority from Japanese application JP2007-146430 filed on Jun. 1, 2007, the content of which is hereby incorporated by reference into this application

BACKGROUND OF THE INVENTION

The present invention relates to an optical pickup and an optical disc apparatus which reproduce information recorded on an optical disc.

As a background technique in the present technical field, there is, for example, JP-A-10-269587. In JP-A-10-269587, there is a description "it is small-sized and thin, it can prevent occurrence of unnecessary stray light easily, and it can conduct signal detection using the push-pull method and signal detection using the three-beams method simultaneously.

As another background technique, there is, for example, JP-A-2006-54006. In JP-A-2006-54006, there is a description "the signal-to-noise ratio of the reproduced signal is prevented from being remarkably lowered when removing offset from the tracking error signal obtained by using the push-pull method.

SUMMARY OF THE INVENTION

In an optical drive, there is a double-layered disc having a double-layered signal recording layer in order to increase the recording capacity. For example, in DVDs, there are double-layered discs in DVD-Rs and DVD-RWs. A capacity which is approximately twice as large as that of a single-layered optical disc is implemented. In the same way, there are double-layered discs in high density recording optical drives such as Blu-ray discs (hereafter abbreviated to BDs) and HD DVDs as well.

In an optical pickup mounted on an optical disc apparatus, servo control signals in the focusing direction and tracking direction of an object lens are formed by using reflected light supplied from an optical disc. If unnecessary stray light is added to the reflected light to be used for the signals, therefore, a trouble occurs in signal detection.

In an optical pickup, an optical beam emitted from a laser light source is split into at least three optical beams of the zeroth-order light and +− first-order light, an optical disc is irradiated with the optical beams, and optical beams reflected by the optical disc are sensed by photodetectors. When conducting reproduction operation for a double-layered disc, the optical pickup poses a problem that unnecessary reflected light from another layer becomes a stray light component and becomes a disturbance component against a tracking signal.

According to JP-A-10-269587 described above, however, a diffraction region is divided so as to sense only the + first-order light and only the − first-order light respectively in order to exclude the stray light components. Accordingly, the diffracted optical beams become half or less in light quantity as compared with original values, and detected signals become small. Furthermore, since the +− first-order optical beams are generated from different divisional regions, ratios among light quantities diffracted in the divisional regions are apt to vary and it becomes difficult to dispose positions of +− first-order optical spots formed on the optical disc, point-symmetrically with respect to the zeroth-order light. Therefore, it is difficult to obtain a favorable servo signal.

In JP-A-2006-54006, a tracking error signal detection scheme which suppresses lowering of the signal-to-noise ratio of a reproduced signal is proposed. However, no regard is paid to stray light emitted from an optical disc having a plurality of recording layers such as a double-layered disc, and a solution concerning the fact that stray light becomes a disturbance component of the tracking signal is not described.

In addition, both the BD and HD DVD are high density recording optical discs. However, the BD and HD DVD are 0.1 mm and 0.6 mm in optical disc substrate thickness, 0.85 and 0.65 in NA (Numerical Aperture), and 0.32 μm and 0.4 μm in track pitch. In this way, the BD and HD DVD are different in optical disc substrate thickness, NA, and track pitch. For coping with both the BD and HD DVD, therefore, it is necessary that the optical pickup has a compatible configuration. In neither JP-A-10-269587 nor JP-A-2006-54006, however, no regard is paid to compatibility among a plurality of kinds of optical discs, such as the BD and HD DVD.

An object of the present invention is to provide an optical pickup and an optical disc apparatus capable of suppressing a variation of the tracking signal in double-layered disc reproduction and capable of being compatible with a plurality of kinds of optical discs such as the BD and HD DVD.

According to one aspect of the present invention, the object can be achieved by conducting a contrivance as regards an optical system which leads laser light to a photodetector and a light sensing face of the photodetector.

According to the present invention, it becomes possible to provide an optical pickup and an optical disc apparatus having a high reliability and capable of being compatible with a plurality of kinds of optical discs.

Other objects, features and advantages of the invention will become apparent from the following description of the embodiments of the invention taken in conjunction with the accompanying drawings.

BRIEF DESCRIPTION OF THE DRAWINGS

FIG. 18 is a schematic block diagram of an optical disc apparatus having an optical pickup mounted thereon.

DETAILED DESCRIPTION OF THE EMBODIMENTS

Figure 1:
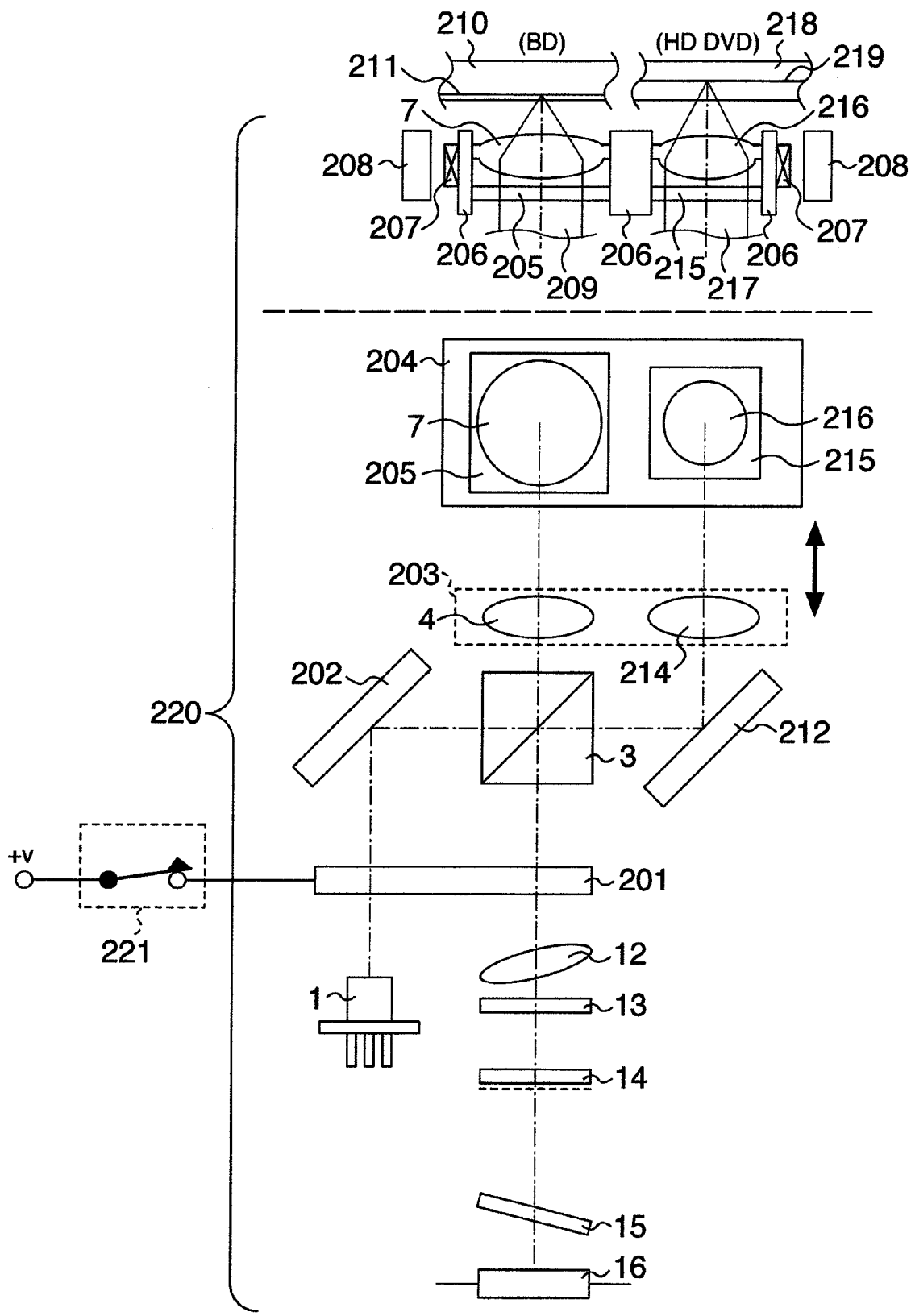
FIG. 1 is a diagram showing a configuration of an optical pickup in a first embodiment.

Hereafter, concrete configurations for implementing the present invention will be described with reference to first to third embodiments. Configurations obtained by combining the embodiments suitably also belong to the present invention. The same members are denoted by like reference characters.

First Embodiment

Hereafter, a configuration of an optical pickup in a first embodiment of the present invention will be described with reference to the drawings.

FIG. 1 is a diagram showing a configuration of an optical pickup in the first embodiment of the present invention. In FIG. 1, a semiconductor laser 1 is a laser diode which can oscillate with a wavelength in a 405 nm band, and the oscillation wavelength at the normal temperature is 405 nm. By the way, the 405 nm band is a wavelength band in which the BD and HD DVD can be subjected to recording and reproducing. FIG. 1 is a state in which an optical beam having a wavelength of 405 nm is emitted. A rotation position of the laser diode 1 is determined around an optical axis of the optical beam so as to cause an optical beam emitted from the laser diode 1 to become an optical beam in a polarized light state (hereafter referred to as P-polarized light) parallel to the paper surface.

An optical beam emitted from the laser diode 1 arrives at a liquid crystal element 201 placed immediately before the laser diode 1. The liquid crystal element 201 is an element capable of rotating the polarization angle of P-polarized light transmitted according to an input signal from a liquid crystal element drive circuit 221 disposed outside the optical pickup by approximately 90 degrees.

After being transmitted by the liquid crystal element 201, the optical beam arrives at a reflecting mirror 202. The reflecting mirror 202 is disposed so as to form an angle of 45° with an emission optical axis of the optical beam emitted from the laser diode 1. The optical beam is reflected to a direction which forms 90° with an incidence direction.

An optical beam reflected by the reflecting mirror 202 arrives at a PBS (Polarized Beam Splitter) prism 3. The PBS prism 3 is an optical element formed of a rectangular solid incorporating a film face which forms an angle of 45° with an optical axis of an incident optical beam. The film face is an optical element which reflects an S-polarized light component of the optical beam having a wavelength in the 405 nm band approximately 100% and reflects a P-polarized light component approximately 0%. As for the optical beam which has arrived at the PBS prism 3, the S-polarized light component is reflected into a direction which forms 90° with the incidence direction by a light quantity depending upon the polarization state, and the P-polarized light component is transmitted.

The optical beam reflected by the reflection film in the PBS prism 3 is converted to a collimating beam by a collimating lens 4. The collimating lens 4 is held in an actuator 203 so as to form one body with another collimating lens 214. The collimate state of the optical beam can be brought into a converging ray state or a diverging ray state by driving the actuator 203 in the optical axis direction of the optical beam. Thus, it is possible to correct spherical aberration in the double-layered disc which will be described later.

An optical beam emitted from the collimating lens 4 is converted in angle by 90° by a reflection mirror 204. A resultant optical beam arrives at a quarter wavelength plate 205. An optical beam 209 is converted to circle polarization light by the quarter wavelength plate 205, and then incident on an object lens 7. The object lens 7 is a lens having a function capable of focusing on an information recording layer 211 of a first optical disc 210 having a disc substrate thickness of 0.1 mm such as, for example, the BD when the optical beam 209 in the 405 nm band is incident as collimating beams.

The quarter wavelength plate 205 and the object lens 7 are held in an actuator 206 formed as one body with a drive coil 207. A magnet 208 is disposed in a position opposed to the drive coil 207. In the configuration, therefore, the object lens 7 can be moved nearly in a radial direction of the optical disc 210 and a direction perpendicular to the disc face by letting a current flow through the drive coil 207 and generating force caused by repulsive force exerted from the magnet 208.

The optical beam reflected by the optical disc 210 returns on the same optical path as that of the outward trip light in a direction opposite to that of the outward trip and arrives at the quarter wavelength plate 205 via the object lens 7. Since most polarization in the optical beam at this time is circle polarization in the same way as the outward trip, the optical beam is converted to P-polarized light perpendicular to the outward trip by being transmitted by the quarter wavelength plate 205. Thereafter, the optical beam is reflected by the reflection mirror 204, and incident on the collimating lens 4. The optical beam is converted from collimating beams to converging rays by the collimating lens 4, and the optical beam arrives at the PBS prism 3. Since the optical beam which has arrived at the PBS prism 3 is the P-polarized light component, the optical beam is transmitted by the film face of the PBS prism 3 100%.

The liquid crystal element 201, a detecting lens 12, a half wavelength plate 13, a polarized grating 14, and a flat plate 15 are disposed on a straight line after the PBS prism 3. The liquid crystal element 201 is the same element as that described with reference to the outward trip. The liquid crystal element 201 is set so as to act on the optical beam on the return trip side as well. Therefore, the polarization state of the optical beam on the return trip side after being transmitted by the liquid crystal element 201 is converted to S-polarized light. The detecting lens 12 is a lens for expanding the composite focal length on the detection system side and canceling extra coma aberration generated on the flat plate 15 disposed further behind to generate astigmatic aberration. An azimuth angle of the half wavelength plate 13 is set so as to rotate the polarization direction of the optical beam around the optical axis by 24°. The polarized grating 14 is provided to split the incident optical beam into three optical beams, i.e., the zeroth-order optical beam and +− first-order optical beams according to the polarization state and irradiate a light detection face 16 with the three optical beams. Details will be described later. The optical beam transmitted by the polarized grating 14 already becomes converging rays by being transmitted by the collimating lens 4. When the optical beam is transmitted by the flat plate 15 inclined with respect to the travel direction of the optical beam, the optical beam is provided with astigmatism. Thereafter, the optical beam is focused on a predetermined light detection face of the photodetector 16. The photodetector 16 can output a servo signal and a reproduced signal obtained from the optical disc 210 by using the sensed optical beam.

On the other hand, in a state in which a switch in the liquid crystal element drive circuit 221 is off, the polarization direction of the optical beam after being transmitted by the liquid crystal element 201 remains P-polarized light. The polarization state of the optical beam which is reflected by the reflecting mirror 202 and which arrives at the PBS prism 3 becomes P-polarized light. As described earlier, the PBS prism 3 transmits the P-polarized light component approximately 100%. Therefore, the optical beam of the P-polarized light which has arrived at the PBS prism 3 is transmitted by the PBS prism 3.

The optical beam transmitted by and emitted from the PBS prism 3 is converted in the optical axis direction by 90° by a reflecting face of a reflecting mirror 212 which is set at 45° with respect to the optical axis of the optical beam, and the optical beam arrives at the collimating lens 214. The optical beam is converted to an optical beam having nearly collimating beams by the collimating lens 214. The collimating lens 214 is held in the actuator 203 so as to form one body with the other collimating lens 4. The collimate state of the optical beam can be brought into a converging ray state or a diverging ray state by driving the actuator 203 in the optical axis direction of the optical beam. Thus, it is possible to correct spherical aberration in the double-layered disc as described earlier.

An optical beam emitted from the collimating lens 214 is converted in angle by 90° by a reflection mirror 204. A resultant optical beam arrives at a quarter wavelength plate 215. An optical beam 217 is converted to circle polarization light by the quarter wavelength plate 215, and then incident on an object lens 216. The object lens 216 is a lens having a function capable of focusing on an information recording layer 219 of a second optical disc 218 having a disc substrate thickness of 0.6 mm such as, for example, the HD DVD when the optical beam 217 in the 405 nm band is incident as collimating beams.

The quarter wavelength plate 215 and the object lens 216 are held in the actuator 206 formed as one body with the drive coil 207 in the same way as the quarter wavelength plate 205 and the object lens 7. The magnet 208 is disposed in a position opposed to the drive coil 207. In the configuration, therefore, the object lens 216 can be moved nearly in a radial direction of the optical disc 218 and a direction perpendicular to the disc face by letting a current flow through the drive coil 207 and generating force caused by repulsive force exerted from the magnet 208.

The optical beam reflected by the optical disc 218 returns on the same optical path as that of the outward trip light in a direction opposite to that of the outward trip and arrives at the quarter wavelength plate 215 via the object lens 216. Since most polarization in the optical beam at that time is circle polarization in the same way as the outward trip, the optical beam is converted to S-polarized light perpendicular to the outward trip by being transmitted by the quarter wavelength plate 215. Thereafter, the optical beam is reflected by the reflection mirror 204, and incident on the collimating lens 214. The optical beam is converted from collimating beams to converging rays by the collimating lens 214, and the optical beam arrives at the PBS prism 3. Since the optical beam which has arrived at the PBS prism 3 is the S-polarized light component, the optical beam is reflected by the film face of the PBS prism 3 100%.

After being reflected by the PBS prism 3, the optical beam arrives at the liquid crystal element 201. Since the liquid crystal element 201 does not act on the optical beam on the return trip side as well, however, the optical beam is transmitted by the liquid crystal element 201 while remaining the S-polarized light. The optical beam incident on the detecting lens 12 can be made S-polarized light in the same way as the case where the first optical disc is played back described earlier.

A part leading to the photodetector 16 via the detecting lens 12, the half wavelength plate 13, the polarized grating 14, and the flat plate 15 is the same as that in the above-described case where the first optical disc is played back. Therefore, its description will be omitted.

An optical pickup 220 is constituted by a combination of optical components and electrical components described above.

Figure 2:
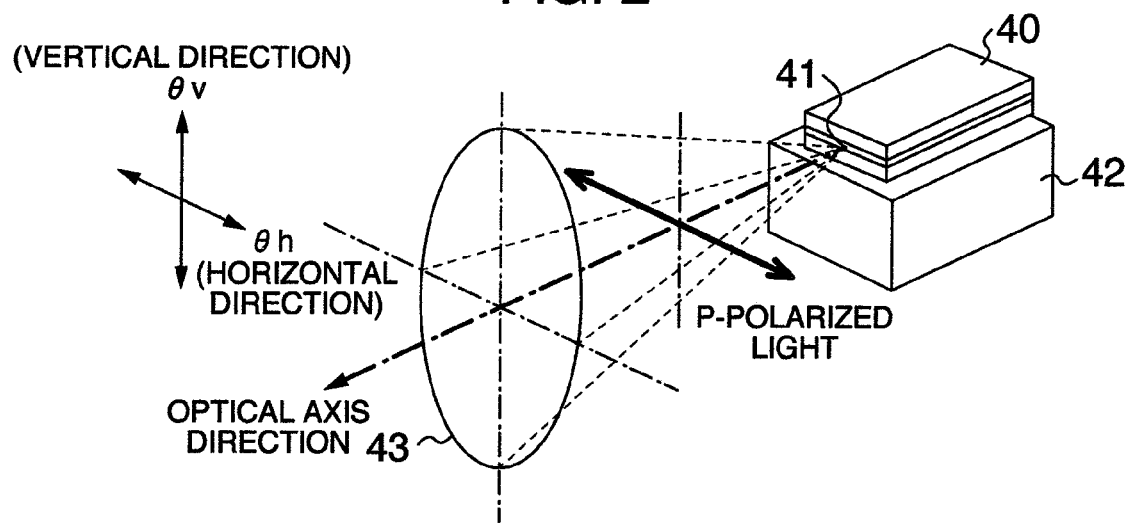
FIG. 2 is a diagram concerning a laser chip mounted on a semiconductor laser and polarized light.

A laser chip mounted on the laser diode and polarization will now be described with reference to FIG. 2. In FIG. 2, a laser chip 40 emits an optical beam in the 405 nm band. The laser chip 40 is mounted on a substrate 42, and mounted within the laser diode 1 shown in FIG. 1. An active layer 41 is formed within the laser chip 40. An optical beam is emitted from an end face of the active layer. The optical beam in the 405 nm band emitted from the end face of the active layer 41 included in the laser chip in a direction which is nearly parallel to the lengthwise direction of the laser chip 40 has a narrow spread angle or Far Field Pattern in a direction θh (horizontal direction) parallel to the active layer 41 with respect to the optical axis of the optical beam and has a wide spread angle or Far Field Pattern in a direction θv (vertical direction) perpendicular to the active layer 41. For example, the spread angle or Far Field Pattern s are approximately 9° and 18°. A spread 43 of the optical beam has elliptical strength distribution which is long in the θv direction. A vibration plane of the optical beam emitted from the laser chip 40 nearly coincides with a plane which is parallel to the active layer 41, i.e., the θh direction. Thus, the optical beam has a polarization state of the so-called P-polarized light which vibrates in a direction indicated by an arrow in FIG. 2.

Figure 3A:
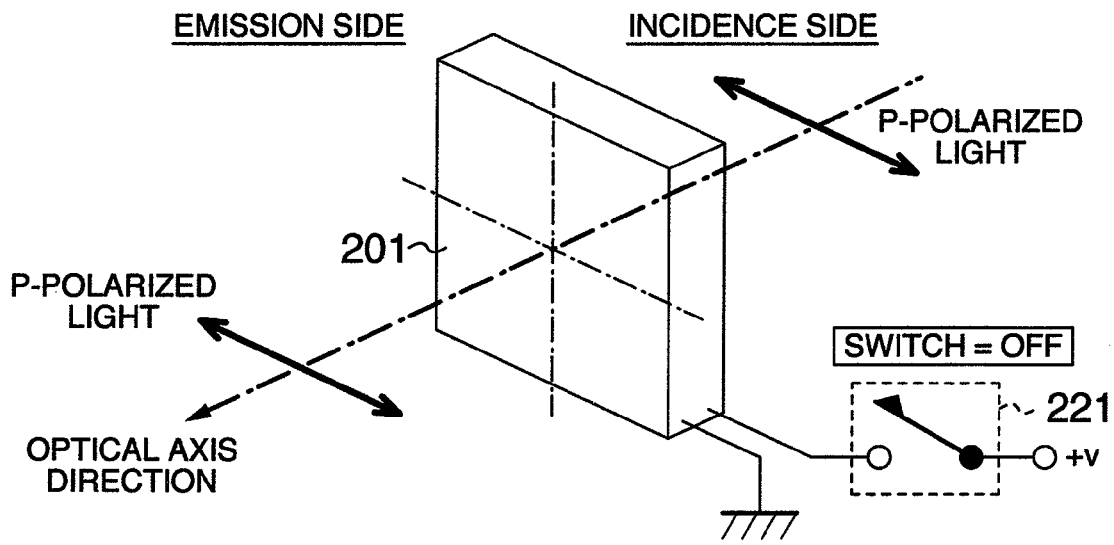
FIGS. 3A and 3B are diagrams for explaining operation of a liquid crystal element.
Figure 3B:
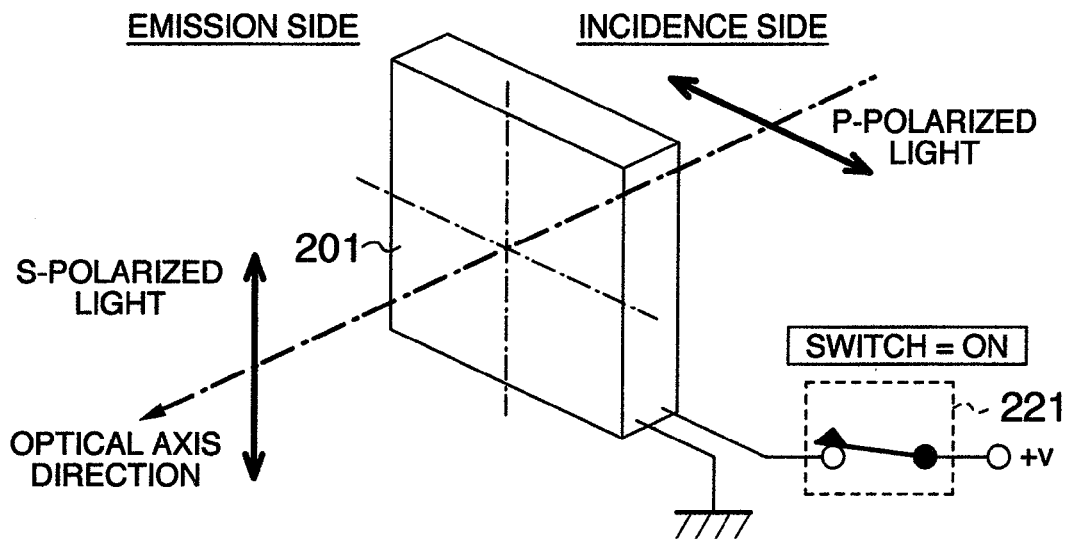

Operation of the liquid crystal element will now be described with reference to FIGS. 3A and 3B. In FIGS. 3A and 3B, the liquid crystal element 201 is a polarization rotation element capable of converting P-polarized light transmitted by the liquid crystal element 201 to S-polarized light rotated in plane of polarization by 90° with respect to the optical axis in response to on/off of an electric signal supplied from the outside. Since the configuration itself of the element has little relation to the present invention, its detailed description will be omitted.

In FIG. 3A, a switch in the liquid crystal element drive circuit 221 is in the off-state. This is a state in which a current is not let flow from the outside to the liquid crystal element 201. In this state, any electric action is not exerted on the liquid crystal element 201. Therefore, P-polarized light incident from the incidence side is passed through the liquid crystal element 201 as it is, and emitted from the emission side while remaining the P-polarized light. On the other hand, in FIG. 3B, the switch in the liquid crystal drive circuit 221 is in the on-state and the liquid crystal element 201 is in a state in which it is subjected to electrical action. In this state, the P-polarized light incident from the incidence side is rotated in polarization plane by 90° in the liquid crystal element 201 and emitted from the emission side as an optical beam of S-polarized light. Thus, the liquid crystal element 201 can rotate the emitted polarized light by 90° with respect to the incidence polarized light according to the on/off of the current flow state. By the way, this liquid crystal element rotates the polarization plane of the optical beam, and a transmittance of at least 95% can be ensured irrespective of the polarization state of the emitted optical beam.

Figure 4:
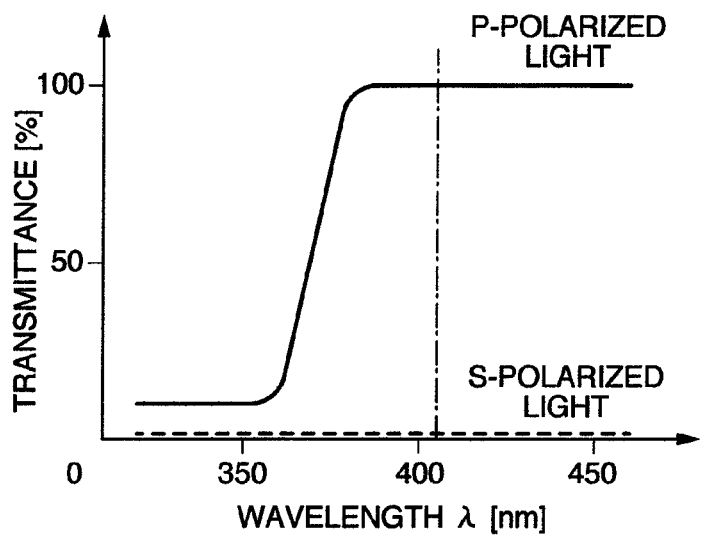
FIG. 4 is a diagram showing characteristics of a film face of a PBS prism 3.

FIG. 4 is a diagram showing characteristics of the film face of the PBS prism 3. In FIG. 4, the abscissa axis indicates the wavelength of the optical beam incident on the film face, and the ordinate axis indicates the transmittance of the incident optical beam. The film face disposed at an angle of 45° with respect to the optical beam has characteristics that an optical beam of P-polarized light is transmitted approximately 100% in the vicinity of 405 nm and an optical beam of S-polarized light is scarcely transmitted in the vicinity of 405 nm. As for the optical beam in the vicinity of 405 nm, most of the P-polarized light is not reflected, but transmitted, whereas the S-polarized light is reflected approximately 100%. In other words, P-polarized light and S-polarized light are nearly separated at the film face, and transmitted and reflected, respectively.

Figure 5:
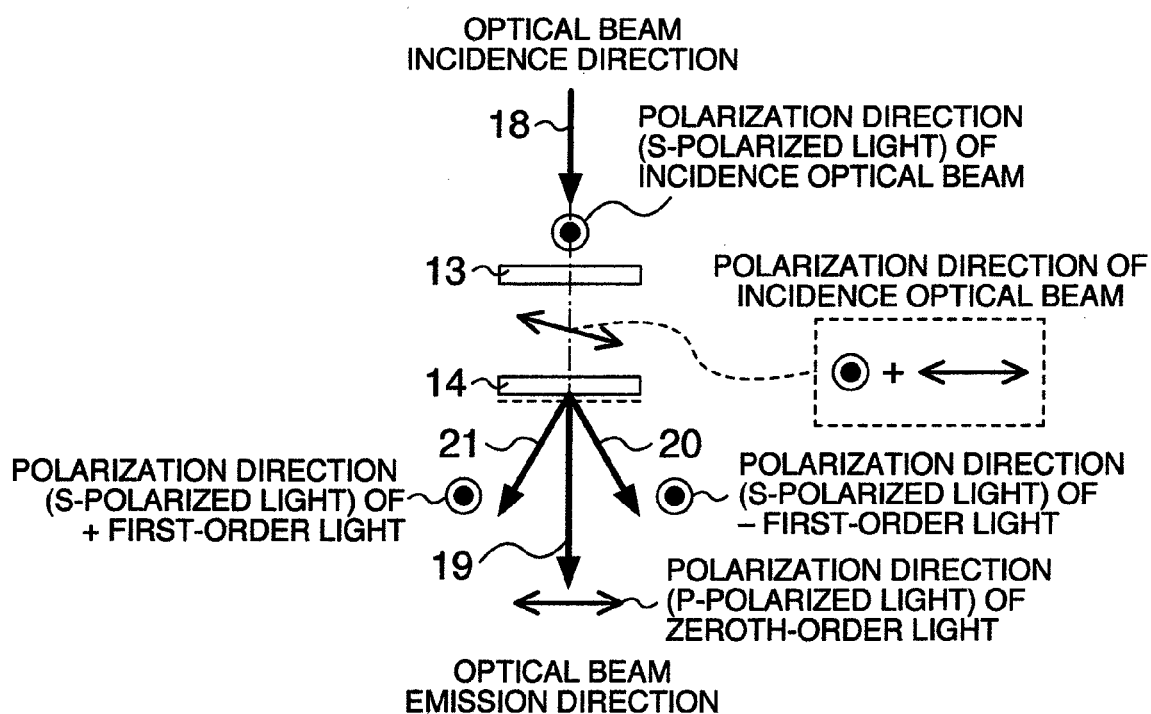
FIG. 5 is a diagram showing a diffraction state of an optical beam in a polarized grating.

FIG. 5 is a diagram showing a diffraction state of an optical beam in a polarized grating. A part including the half wavelength plate 13 and the polarized grating 14 is extracted from FIG. 1. In FIG. 5, a return optical beam from the optical disc 210 or 218 travels in a direction indicated by an arrow 18 shown in FIG. 5, and becomes an optical beam incident on the half wavelength plate 13. The polarization direction of the optical beam incident on the half wavelength plate 13 is a polarization direction perpendicular to the paper surface (S-polarized light). The azimuth angle of the half wavelength plate 13 is inclined by 33° around the optical axis. Therefore, the polarization direction of the optical beam transmitted by the half wavelength plate 13 becomes linearly polarized light inclined by $\alpha=66°$ around the optical axis as shown in FIG. 5. In a polarization state having a P-polarized light component and an S-polarized light component, the optical beam is incident on the polarized grating 14. The polarized grating 14 diffracts an optical beam which becomes an S-polarized light component for the grating, as +− first-order light having a predetermined angle. Therefore, a light quantity corresponding to the square of cos $\alpha$ is split into + first-order light and − first-order light, and diffracted. At this time, the polarization direction of the diffracted +− first-order light 20 and 21 becomes S-polarized light having a vibration plane perpendicular to the paper surface indicated by a circle shown in FIG. 5. On the other hand, a light quantity corresponding to square of sin $\alpha$ included in the optical beam incident on the polarized grating 14 is passed through the polarized grating 14 as the zeroth-order light. At this time, the polarization direction of the zeroth-order light becomes P-polarized light having a vibration plane parallel to the paper surface indicated by a circle shown in FIG. 5. In other words, after being transmitted by the polarized grating 14, an optical beam 19 is split into zeroth-order light 19 formed of a P-polarized light component and +− first-order light 20 and 21 formed of an S-polarized light component.

Figure 6:
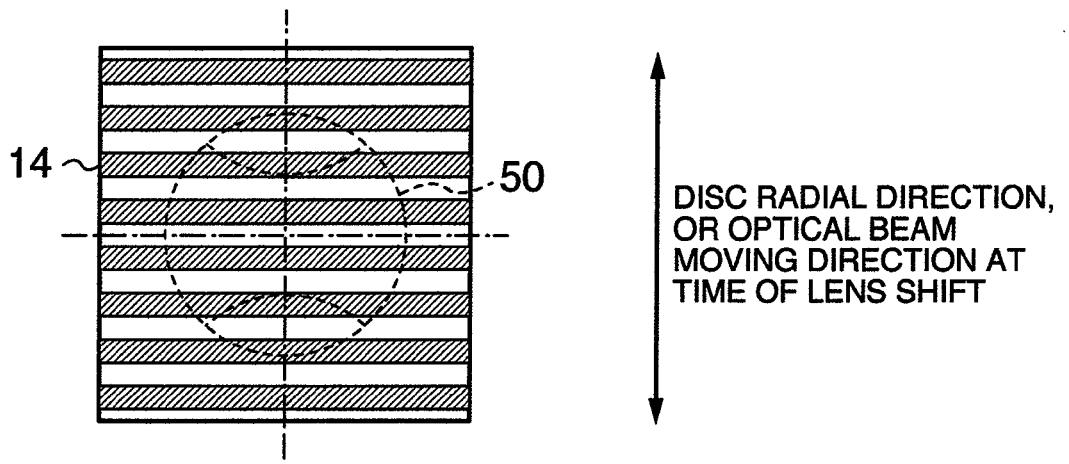
FIG. 6 is a diagram showing a pattern of a polarized grating.

A pattern of the polarized grating in the first embodiment will now be described with reference to FIG. 6. FIG. 6 is a diagram showing the pattern of the polarized grating 14. Grating grooves depending upon the polarization which diffracts S-polarized light approximately 100% and transmits P-polarized light approximately 100% are formed on the surface of the polarized grating 14. The polarized grating 14 is disposed so as to cause a direction of a diffraction pattern (ball shape image) of an optical beam indicated by a dash line and obtained from the groove structure of the optical disc, i.e., the radial direction of the disc to coincide with a direction perpendicular to the grating grooves indicated by an up-and-down direction in FIG. 6.

Figure 7:
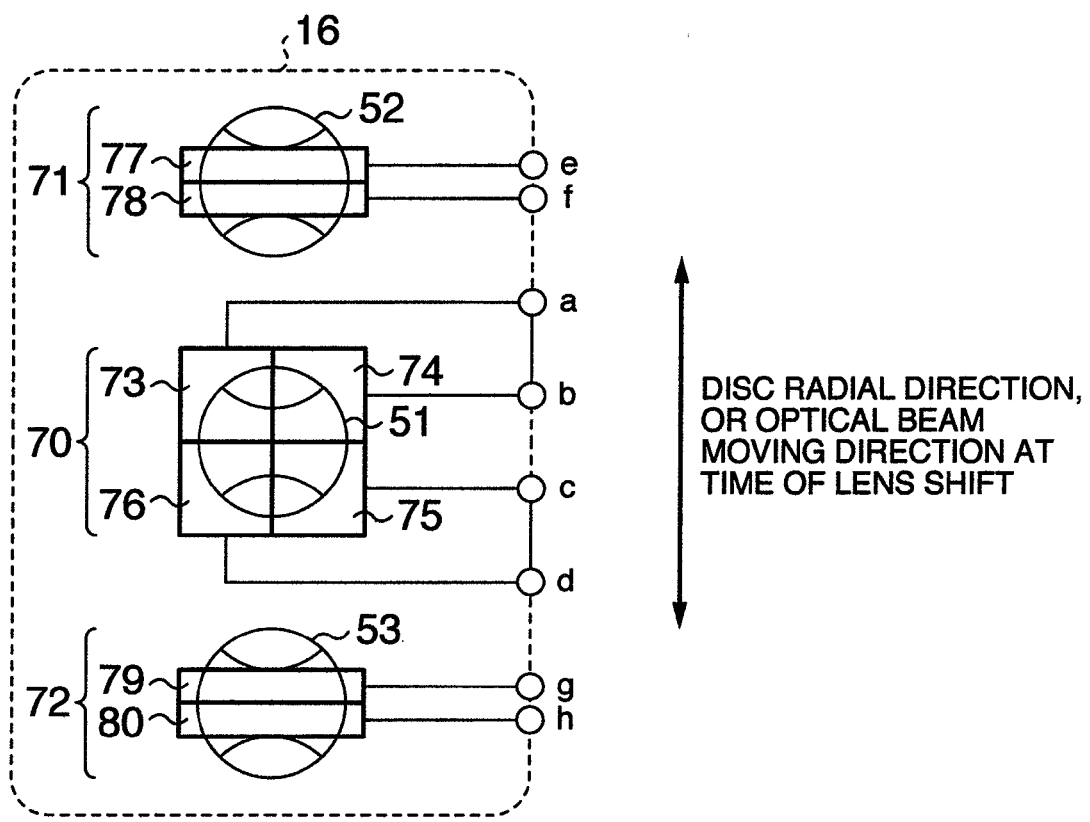
FIG. 7 is a diagram showing a light sensing face pattern of a photodetector.

A light sensing face pattern of the photodetector will now be described. FIG. 7 is a diagram showing the light sensing face pattern of a photodetector 16. Three light sensing regions 70, 71 and 72 are formed on the photodetector 16. The light sensing region 71 and the light sensing region 72 are disposed in positions which are symmetrical to each other about the light sensing region 70. The light sensing region 70 is divided into four light sensing faces 73, 74, 75 and 76. An output of the light sensing face 73 is output from a terminal a. An output of the light sensing face 74 is output from a terminal b. An output of the light sensing face 75 is output from a terminal c. An output of the light sensing face 76 is output from a terminal d. The light sensing region 71 has a configuration in which two strip-shaped light sensing faces 77 and 78 are adjacent to each other as upper and lower faces. An output of the light sensing face 77 is output from a terminal e. An output of the light sensing face 78 is output from a terminal f. The light sensing region 72 has a configuration in which two strip-shaped light sensing faces 79 and 80 are adjacent to each other as upper and lower faces. An output of the light sensing face 79 is output from a terminal g. An output of the light sensing face 80 is output from a terminal h.

In the first embodiment, a vicinity of a center of the light sensing region 70 in the photodetector 16 is irradiated with an optical beam 51 of the zeroth-order light transmitted by the polarized grating 14 intact. A vicinity of a center of the light sensing region 71 is irradiated with an optical beam 52 of the + first-order light diffracted by the polarized grating 14. A vicinity of a center of the light sensing region 72 is irradiated with an optical beam 53 of the − first-order light. In the first embodiment, the optical beam is provided with astigmatic aberration by the action of the flat plate 15 shown in FIG. 1 and a focusing error signal is detected by using the so-called astigmatic detection method. Therefore, each of the optical beams 51, 52 and 53 forms a spot having a diameter of approximately 50 micron on the detection face. Furthermore, optical components in the optical pickup 220 are set so as to cause the direction of the diffraction pattern existing in each optical beam, i.e., the disc radial direction to coincide with the diffraction direction of the + first-order light 52 and the − first-order light 53. In the light sensing regions 71 and 72, widths of the light sensing faces 77, 78, 79 and 80 in the up-and-down direction are set so as to detect signals from vicinities of the center where a diffraction pattern is not generated within the + first-order light 52 and the − first-order light 53.

Figure 8:
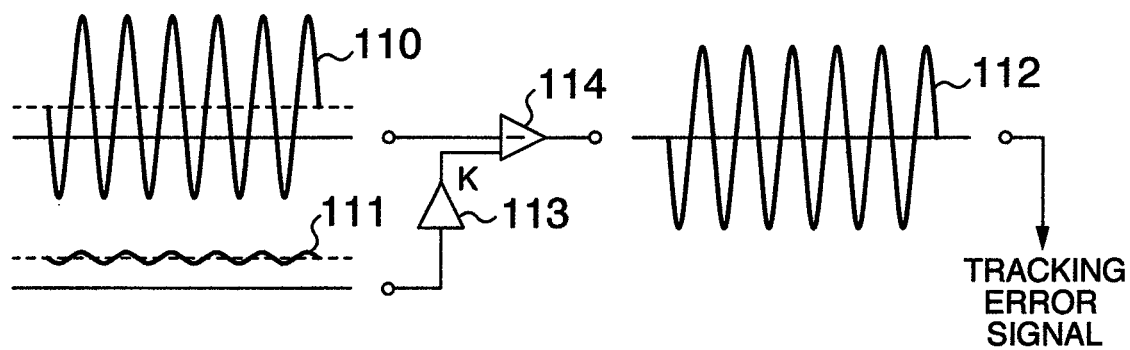
FIG. 8 is a diagram showing a tracking signal waveform.

A method for generating a focusing error signal and a tracking error signal in the first embodiment will now be described with reference to FIG. 7 and FIG. 8. The focusing error signal can be obtained by performing the following operation called astigmatic detection method on an output signal obtained by sensing the zeroth-order light 51 in the light sensing region 70.

Focusing error signal=$(a+c)-(b+d)$

As for the principle of the astigmatic detection method, its description will be omitted because the astigmatic detection method is a known technique.

On the other hand, the tracking error signal can be obtained by performing the following operation similar to the so-called differential push-pull method (DPP method) on output signals obtained respectively from the zeroth-order light 51, the + first-order light 52 and the − first-order light 53.

Tracking error signal=$((a+b)-(c+d))-K*((e-f)+(g-h))$

As for the principle of the DPP method, its description will be omitted because the DPP method is a known technique. The first half term $(a+b)-(c+d)$ is a part for generating the so-called push-pull signal as represented by a waveform 110 from the zeroth-order light 51. The waveform 110 is obtained supposing the case where the object lens 7 is shifted in the disc radial direction and a DC offset of some quantity is given to the push-pull signal. The first term (e–f) in the latter half term generates an offset signal proportionate to a shift in the radial direction of the object lens 7 by detecting the spot position movement and distribution light quantity change of the + first-order light 52 caused by a shift of the object lens 7 in the radial direction. In the same way, the second term (g–h) in the latter half term generates an offset signal proportionate to a shift in the radial direction of the object lens 7 by detecting the spot position movement and distribution light quantity change of the – first-order light 53. The offset signal obtained from the latter term (e–f)+(g–h) is detected from a part where a diffraction pattern is not generated, in the + first-order light 52 and the – first-order light 53. Therefore, the offset signal scarcely contains the push-pull signal component and the offset signal has a DC offset as represented by a waveform 111. A subtracter 114 conducts processing of subtracting the waveform 111 multiplied by a gain K 113 from the waveform 110. As a result, a favorable push-pull waveform having no DC offset as represented by a waveform 112 can be obtained as the tracking error signal. Therefore, it is possible to prevent a DC offset from being generated in the tracking error signal even if there is a shift of the object lens 7 in the radial direction.

The polarization state of the optical beam in the optical pickup will now be described with reference to FIG. 9 and FIG. 10. Since components shown in FIG. 9 and FIG. 10 have already been described with reference to FIG. 1, description of them will be omitted.

Figure 9:
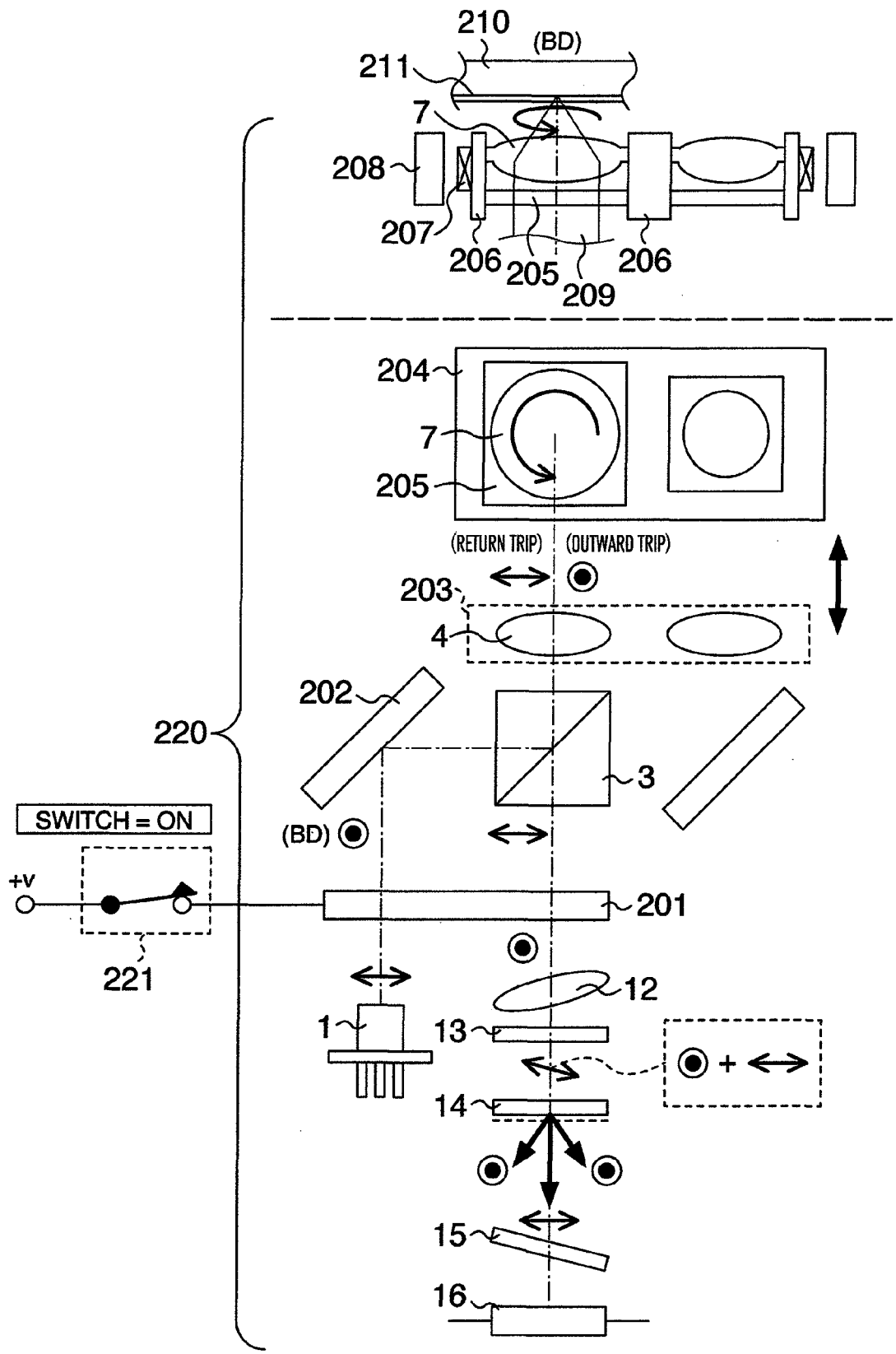
FIG. 9 is a diagram showing a polarization state in the case where a first optical disc is played back.

FIG. 9 is a diagram showing a polarization state in the case where the first optical disc is played back. In FIG. 9, an optical beam emitted from the laser diode 1 is incident on the liquid crystal element 201. When playing back the first optical disc 210, the switch in the liquid crystal element drive circuit 221 is turned on. As a result, the polarization state of the optical beam passing through the liquid crystal element 201 is rotated from P-polarized light parallel to the paper surface as indicated by arrows in FIG. 9 to S-polarized light perpendicular to the paper surface as indicated by a double circle in FIG. 9. Thereafter, the optical beam is reflected by the reflecting mirror 202, and then the optical beam arrives at the PBS prism 3. Since the PBS prism 3 reflects the S-polarized light approximately 100%, the optical beam is reflected by the film face of the PBS prism 3 in the state of the S-polarized light and emitted from the PBS prism 3. The optical beam of the S-polarized light is reflected by the reflection mirror 204 via the collimating lens 4 to arrive at the quarter wavelength plate 205. The optical beam is converted in polarization state to circle polarization light by the quarter wavelength plate 205 and incident on the object lens 7. Thereafter, the optical beam is reflected by the recording layer 211 of the first optical disc 210, and the optical beam arrives at the quarter wavelength plate 205 via the object lens 7 in the state of circle polarization again. In the return trip, the zeroth-order light is converted to linear-polarized light in a direction perpendicular to the outward trip when transmitted by the quarter wavelength plate 205. In other words, P-polarized light having a polarization direction which is parallel to the paper surface and which is indicated by arrows in FIG. 9 is obtained. Thereafter, the optical beam is incident on the collimating lens 4, and converted from collimating beams to converging rays by the collimating lens 4. However, the optical beam arrives at the PBS prism 3 with the polarization state kept in the P-polarized state. Since the film face of the PBS prism 3 transmits the optical beam of P-polarized light approximately 100% as described above, light reflected by the first optical disc is transmitted by the PBS prism 3 and incident on the liquid crystal element 201. In other words, the PBS prism 3 shown in FIG. 9 reflects the optical beam in the outward trip because the optical beam is S-polarized light, and transmits the optical beam in the return trip because the optical beam is P-polarized light. In the liquid crystal element 201, incident P-polarized light is rotated in polarization direction by 90° due to action of the liquid crystal element and resultant S-polarized light is emitted.

After the detecting lens 12, the azimuth angle of the half wavelength plate 13 is set so as to rotate the polarization direction of the optical beam by 66° around the optical axis as described earlier. Therefore, the optical beam transmitted by the half wavelength plate 13 is rotated around the optical axis to linearly polarized light having both a P-polarized light component and an S-polarized light component. The optical beam emitted from the half wavelength plate 13 is incident on the polarized grating 14. The polarized grating 14 transmits the P-polarized light component included in the incident optical beam as the zeroth-order light, and diffracts the S-polarized light component as the +– first-order light. The zeroth-order light and the +– first-order light emitted from the polarized grating 14 are transmitted by the flat plate 15 with the polarization states maintained and arrive at the predetermined light sensing face of the photodetector 16.

The polarization state in the case where the second optical disc is played back will now be described with reference to FIG. 10. In FIG. 10, an optical beam emitted from the laser diode 1 is incident on the liquid crystal element 201. When playing back the second optical disc 218, the switch in the liquid crystal element drive circuit 221 is turned off. As a result, the polarization state of the optical beam passing through the liquid crystal element 201 remains P-polarized light parallel to the paper surface as indicated by arrows in FIG. 10. Thereafter, the optical beam is reflected by the reflecting mirror 202, and then the optical beam arrives at the PBS prism 3. Since the PBS prism 3 transmits the P-polarized light approximately 100%, the optical beam is transmitted by the film face of the PBS prism 3 while remaining the state of the P-polarized light and emitted from the PBS prism 3. After being changed by 90° in optical axis direction by the reflecting mirror 212, the optical beam of the P-polarized light is reflected by the reflection mirror 204 via the collimating lens 214 and arrives at the quarter wavelength plate 215. The optical beam is converted in polarization state to circle polarization by the quarter wavelength plate 215 and incident on the object lens 216. Thereafter, the optical beam is reflected by the recording layer 219 of the second optical disc 218, and the optical beam arrives at the quarter wavelength plate 215 via the object lens 216 in the state of circle polarization again. In the return trip, the zeroth-order light is converted to linear-polarized light in a direction perpendicular to the outward trip when transmitted by the quarter wavelength plate 215. In other words, S-polarized light having a polarization direction which is perpendicular to the paper surface and which is indicated by a double circle in FIG. 10 is obtained. Thereafter, the optical beam is incident on the collimating lens 214, and converted from collimating beams to converging rays by the collimating lens 214. However, the optical beam is reflected by the reflecting mirror 212 while remaining S-polarized light in polarization state and then arrives at the PBS prism 3. Since the film face of the PBS prism 3 reflects the optical beam of the P-polarized light approximately 100% as described earlier, the light reflected by the second optical disc is reflected by the PBS prism 3 and emitted toward the liquid crystal element 201.

Figure 10:
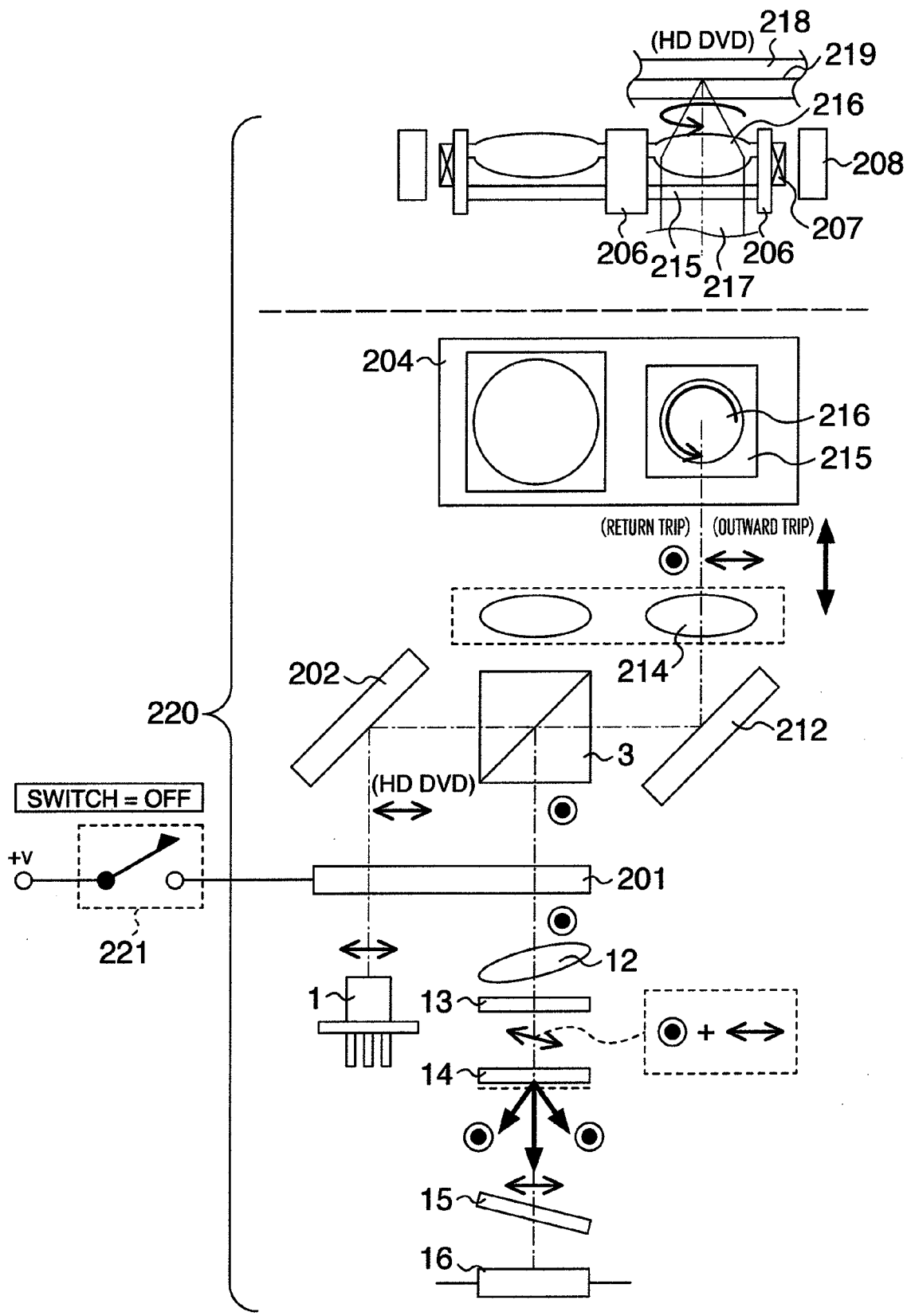
FIG. 10 is a diagram showing a polarization state in the case where a second optical disc is played back.

In other words, the PBS prism 3 shown in FIG. 10 transmits the optical beam in the outward trip because the optical beam is P-polarized light, and reflects the optical beam in the return trip because the optical beam is S-polarized light. In the liquid crystal element 201, the liquid crystal element 201 does not act. Therefore, the incident S-polarized light is emitted intact as the S-polarized light.

After the detecting lens 12, the azimuth angle of the half wavelength plate 13 is set so as to rotate the polarization direction of the optical beam by 66° around the optical axis in the same way as FIG. 9. Therefore, the optical beam transmitted by the half wavelength plate 13 is rotated around the optical axis to linearly polarized light having both a P-polarized light component and an S-polarized light component. The optical beam emitted from the half wavelength plate 13 is incident on the polarized grating 14. The polarized grating 14 transmits the P-polarized light component included in the incident optical beam as the zeroth-order light, and diffracts the S-polarized light component as the +− first-order light. The zeroth-order light and the +− first-order light emitted from the polarized grating 14 are transmitted by the flat plate 15 with the polarization states maintained and arrive at the predetermined light sensing face of the photodetector 16.

As heretofore described, in the first embodiment, the polarization direction of the optical beam transmitted by the liquid crystal element 201 in the outward trip is made to become S-polarized light or P-polarized light. As a result, it is possible to lead the optical beam to the first object lens 7 in the case of S-polarized light and lead the optical beam to the second object lens 216 in the case of P-polarized light. In addition, reflected light from either of the first and second optical discs is made to be transmitted by the liquid crystal element 201 in the return trip. As a result, it is possible to make the polarization direction of both optical beams after the liquid crystal element 201 the same and detect the signal supplied from the optical disc in the photodetector.

Figure 11:
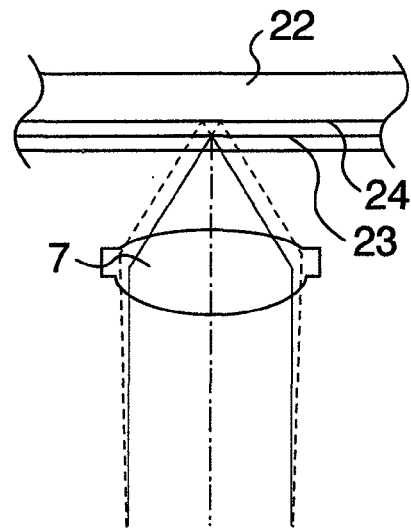
FIG. 11 is a diagram showing a state of an optical beam in a double-layered disc part in the case where a double-layered disc is played back.

The state of the optical beam in the case where a double-layered disc is played back will now be described with reference to FIG. 11. FIG. 11 is a diagram showing a state of the optical beam in a doubled-layer disc part in the case where the doubled-layer disc is played back. In FIG. 11, arrangement of optical components is the same as the configuration shown in FIG. 1, and its description will be omitted.

The object lens 7 focuses an optical beam emitted from the laser diode 1 which is not illustrated on a recording layer 23 on the double-layered optical disc 22 to be played back. The optical beam reflected by the recording layer 23 becomes an optical beam on the same optical path as the outward trip as indicated by solid lines in FIG. 11, and arrives at the photodetector 16 which is not illustrated. The double-layered disc is an optical disc having two recording layers 23 and 24. The recording layer 23 located nearer the object lens 7 is set to have recording layer characteristics so as to reflect an optical beam of a predetermined quantity and transmit an optical beam of a predetermined quantity and lead it to the recording layer 24. Even if an optical beam is focused on the recording layer 23, therefore, an optical beam of a definite quantity is necessarily transmitted by the recording layer 23. An optical beam focused on the recording layer 23 and then transmitted by the recording layer 23 is totally reflected by the recording layer 24 as indicated by a dotted line, and the optical beam arrives at the collimating lens 4 via the object lens 7. The optical beam reflected by the recording layer 24 and indicated by the dotted line differs in converging state from the optical beam reflected by the recording layer 23 and indicated by the solid line. Therefore, a focusing state is temporarily achieved before arriving at the photodetector 16, and the effective diameter of the optical beam becomes somewhat greater on the photodetector 16.

Figure 12:
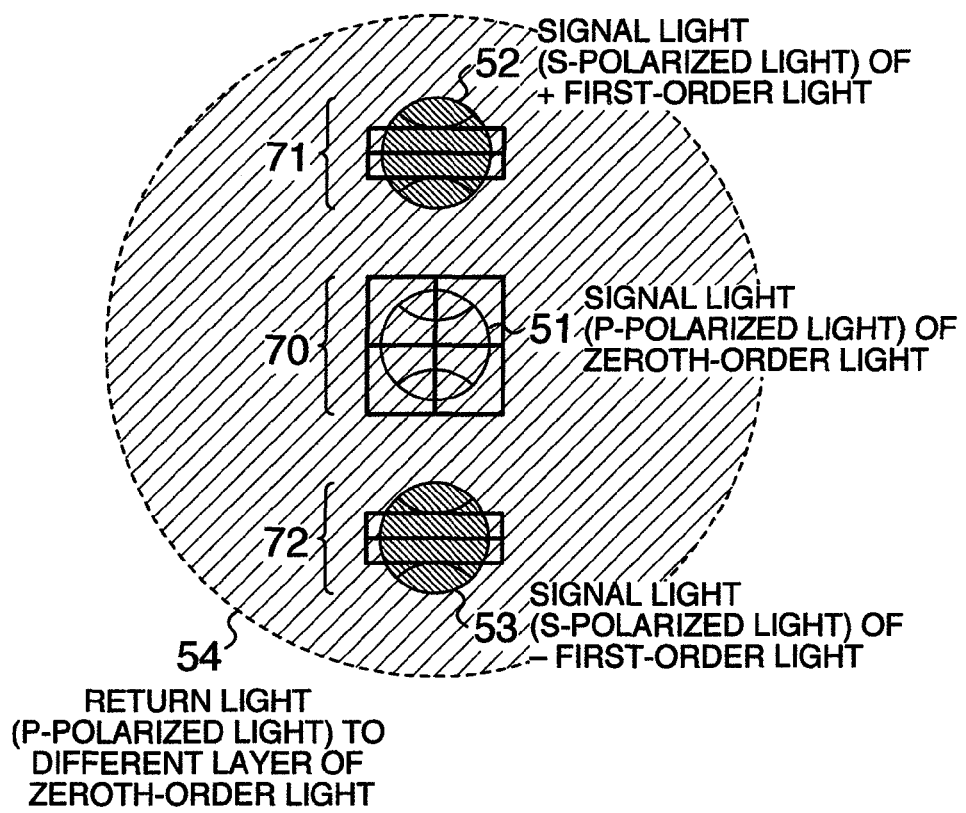
FIG. 12 is a diagram showing spot states on a photodetector in the case where a double-layered disc is played back.

FIG. 12 is a diagram showing spot states on the photodetector in the case where the double-layered disc is played back. In FIG. 12, a spot of signal light from a desired recording layer and a spot of light reflected by another recording layer are shown in superposition. The light sensing region 70, the light sensing region 71 and the light sensing region 72 described earlier are disposed in the photodetector. The photodetector 16 is adjusted in position so as to irradiate these light sensing regions with signal light from a desired recording layer. The light sensing region 70 is irradiated with the zeroth-order light 51. The light sensing region 71 is irradiated with the +first-order light 52. The light sensing region 72 is irradiated with the − first-order light 53. Therefore, it is possible to output the focusing error signal according to the astigmatic detection method and the tracking error signal according to a method similar to the differential push-pull method by performing operation on output signals from the light sensing regions 70, 71 and 72, as described earlier. In the first embodiment, linearly polarized light is incident so as to form a predetermined angel with the polarized grating 14. Therefore, the signal light of the zeroth-order light is P-polarized light indicated by rightward rising shaded lines in FIG. 12, and the signal light of the +− first-order light is S-polarized light indicated by leftward rising shaded lines in FIG. 12. The zeroth-order light and the +− first-order light are perpendicular to each other in polarization state.

When playing back the double-layered disc, the photodetector face is irradiated with return light 54 from zeroth-order light reflected by the other layer. This return light 54 is nearly on a circle which is concentric to the signal light of the zeroth-order light. The circle has a diameter which is large enough to incorporate not only the light sensing region 70 but also the light sensing regions 71 and 72. As compared with the + first-order signal light 52, the return light 54 with which the same light sensing region 71 is irradiated is nearly equal or approximately one severaths in light quantity, but substantially equal in optical path length. If the return light 54 and the + first-order signal light forms a combination of the same polarization state, interference with the + first-order signal light is caused by a face spacing variation between the recording layers 23 and 24. In that case, the interference causes a variation in the tracking error signal obtained from the light sensing region 71. In the first embodiment according to the present invention, the polarization direction of the return light 54 is P-polarized light and the + first-order signal light 52 is S-polarized light. Therefore, the return light 54 slightly increases the total light quantity in the light sensing region 71. However, the return light 54 does not become a variation factor due to interference. Therefore, the tracking error signal which can be output from the light sensing regions 71 and 72 is not varied by the interference.

In other words, the zeroth-order light and the +− first-order light which generate the tracking error signal are made perpendicular to each other in polarization, and the tracking error signal is generated from the difference signal between them. Therefore, the zeroth-order light and the +− first-order light do not interfere with each other and a favorable tracking error signal can be obtained. In the first embodiment of the present invention, compatibility with the BD and the HD DVD can be achieved while adopting the optical system configuration capable of coping with the double-layered disc.

According to the first embodiment, one liquid crystal element can be used for both the changeover of the polarization state of the optical beam in the outward trip and the changeover of the polarization state of the optical beam in the return trip, as heretofore described. As a result, it is possible to realize an optical system coping with the double-layered disc and coping with the compatibility with the BD and the HD DVD by using a configuration reduced in the number of components.

Second Embodiment

Figure 13:
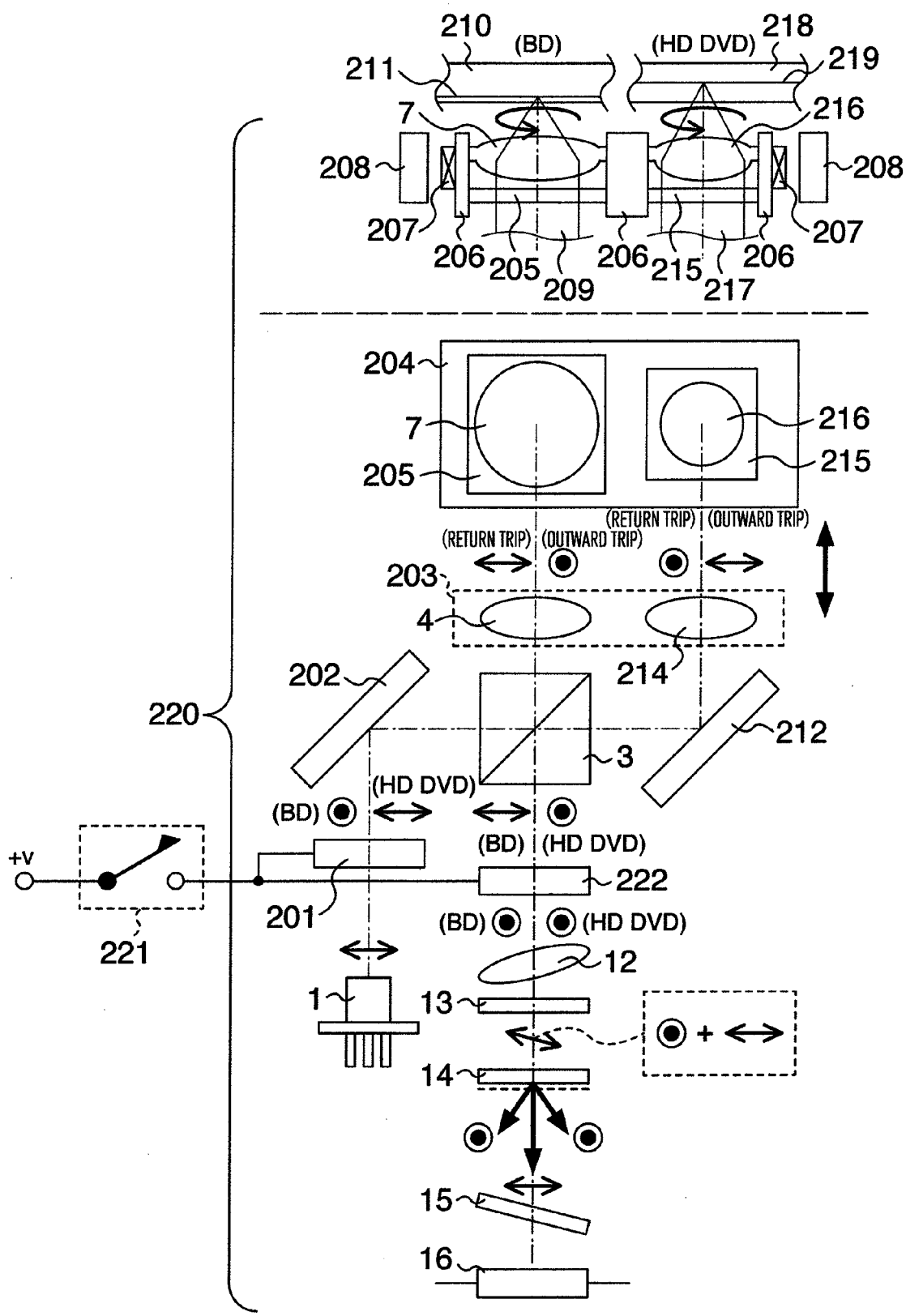
FIG. 13 is a diagram showing a configuration of an optical system in a second embodiment.

A second embodiment will now be described with reference to FIG. 13. FIG. 13 is a diagram showing a configuration of an optical system in the second embodiment. A component arrangement of an optical pickup in the second embodiment has a part common to that shown in FIG. 1 and described earlier. Therefore, the same components are denoted by like reference numerals. The second embodiment has a feature that the liquid crystal element 201 is disposed before the laser diode 1 whereas another liquid crystal element 222 is disposed on the optical path between the PBS prism 3 and the photodetector 16 and both of the two liquid crystal elements are driven together by the switch 221 in the liquid crystal element drive circuit.

The polarization state of the optical beam on the optical pickup caused by the two liquid crystal elements 201 and 222 becomes the same as that described in the first embodiment. In the same way as the first embodiment, therefore, it is possible to cope with both the BD disc and the HD DVD disc and decrease the variation of the tracking error signal in the double-layered disc. Because of the configuration having one liquid crystal element in each of the outward trip and return trip, it is possible to increase the degree of freedom in the liquid crystal element mounting as compared with the first embodiment. For example, it is also possible to eliminate the reflecting mirror 202 and cause the optical beam from the liquid crystal element to be incident directly on the PBS prism 3.

In addition, according to the second embodiment, it is possible to operate the liquid crystal element for changing over the polarization state of the optical beam in the outward trip and the liquid crystal element for changing over the polarization state of the optical beam in the return trip by using the common drive circuit. As a result, it is possible to realize an optical system coping with the double-layered disc and coping with the compatibility with the BD and the HD DVD by using a configuration reduced in the number of components.

Third Embodiment

Figure 14:
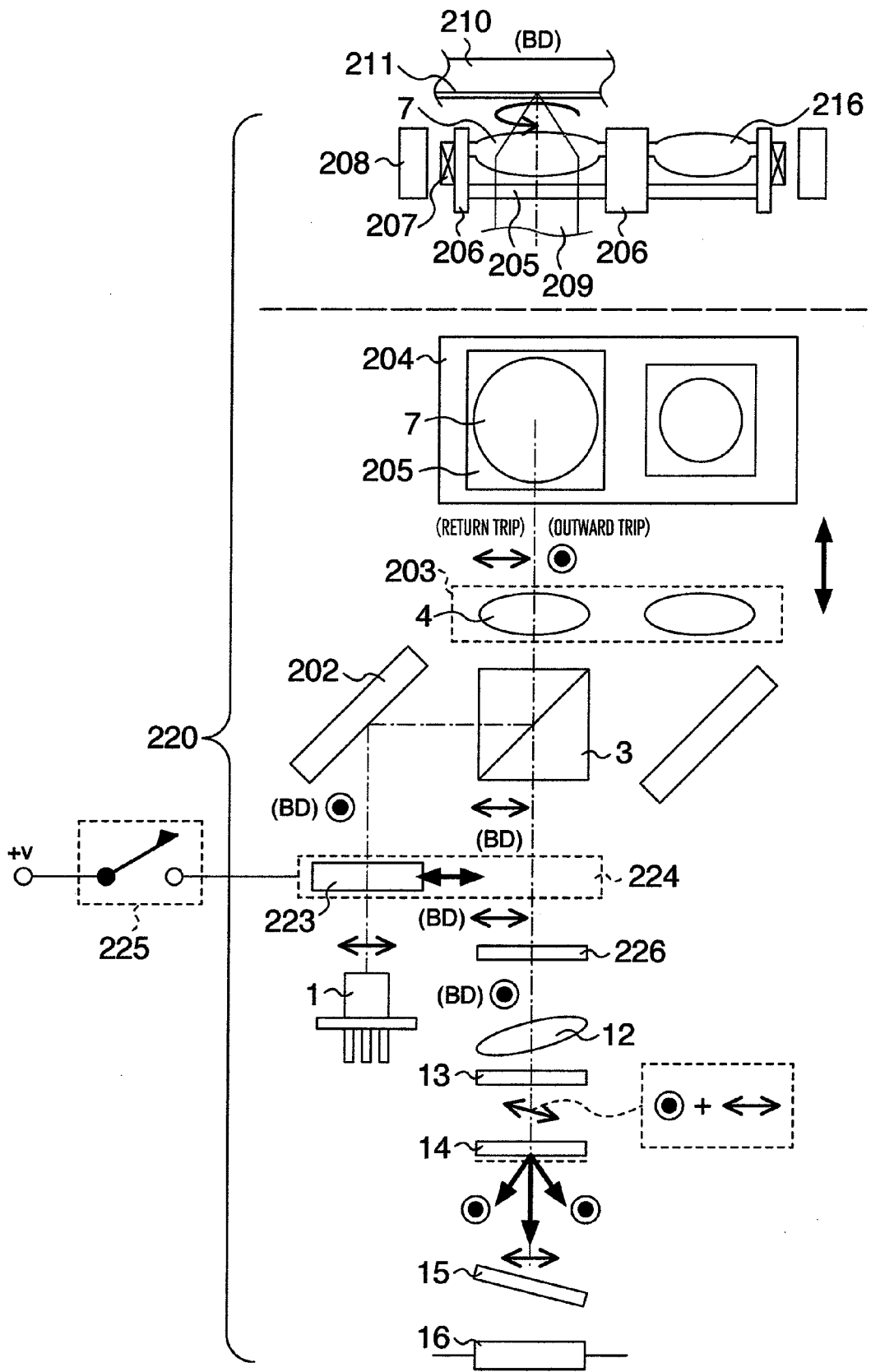
FIG. 14 is a diagram showing a polarization state in the case where a first optical disc is played back in a third embodiment.
Figure 15:
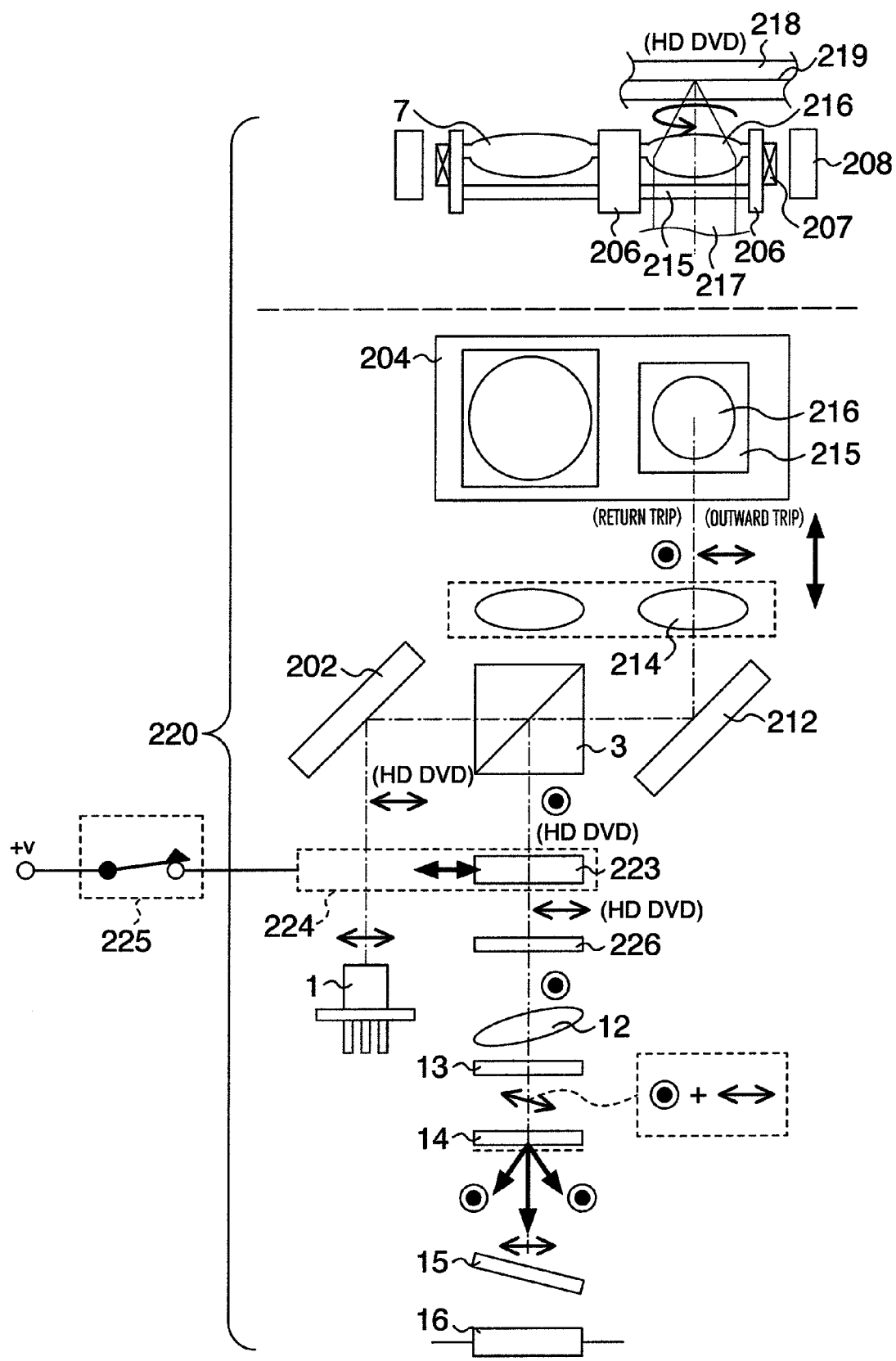
FIG. 15 is a diagram showing a polarization state in the case where a second optical disc is played back in a third embodiment.

A third embodiment of the present invention will now be described with reference to FIGS. 14 and 15. FIGS. 14 and 15 show a configuration of an optical system in the third embodiment. FIG. 14 shows the case where, for example, a BD disc is played back as the first optical disc. FIG. 15 shows the case where, for example, an HD DVD is played back as the second optical disc. A component arrangement of an optical pickup in the third embodiment has a part common to that shown in FIG. 1 and described earlier. Therefore, the same components are denoted by like reference numerals.

In the third embodiment, a half wavelength plate 223 is disposed before the laser diode 1. By operating a half wavelength plate drive circuit switch 225, the position of the half wavelength plate 223 can be moved in a range of a half wavelength plate drive mechanism 224 indicated by a dotted line frame in FIG. 14. The half wavelength plate drive mechanism 224 is a drive mechanism such as, for example, a solenoid. The half wavelength plate drive mechanism 224 has a structure which moves between the position located in front of the laser diode 1 and the position located between the PBS prism 3 and the photodetector 16 according to on/off operation of the half wavelength plate drive circuit switch 225.

When playing back the BD, the optical beam emitted from the laser diode 1 is converted from P-polarized light to S-polarized light by the half wavelength plate 223 as shown in FIG. 14. As described with reference to the first embodiment, the optical beam of S-polarized light is reflected toward the first object lens 7 by the PBS prism 3, reflected by the optical disc 210, and then returned to the PBS prism 3. Since the polarization state of the optical beam is P-polarized light at that time, the optical beam is transmitted by the PBS prism 3. Since the half wavelength plate 223 is disposed before the laser diode 1 in FIG. 14, the half wavelength plate 223 is not present after the PBS prism 3 and the optical beam travels through the position of the half wavelength plate drive mechanism 224 with the polarization state remaining P-polarized light. Thereafter, the optical beam is rotated in polarization direction by 90° in a half wavelength plate 226, and incident on the detecting lens 12 in the state of S-polarized light. After the detecting lens 12, the optical beam arrives at the photodetector 16 in the same way as the first embodiment.

On the other hand, when playing back the HD DVD, the half wavelength plate 223 located before the laser diode 1 is moved to the position between the PBS prism 3 and the photodetector 16 by turning on the half wavelength plate drive circuit switch 225 as shown in FIG. 15. Therefore, the optical beam emitted from the laser diode 1 arrives at the PBS prism 3 while remaining P-polarized light and the optical beam is transmitted by the PBS prism 3 intact. Thereafter, the optical beam is focused on the optical disc 218 by the object lens 216, reflected, and then returned to the PBS prism 3, as described with reference to the first embodiment. Since the polarization state of the optical beam is S-polarized light at that time, the optical beam is reflected by the PBS prism 3. Since the half wavelength plate 223 is located between the PBS prism 3 and the photodetector 16 as shown in FIG. 15, the half wavelength plate 223 rotates the polarization state of the optical beam by 90° and the half wavelength plate 226 further rotates the rotation direction by 90°. Therefore, the optical beam is incident on the detecting lens 12 in the state of S-polarized light. After the detecting lens 12, the optical beam arrives at the photodetector 16 in the same way as the first embodiment described earlier.

Owing to such a configuration, one liquid crystal element can be used for both the changeover of the polarization state of the optical beam in the outward trip and the changeover of the polarization state of the optical beam in the return trip. As a result, it is becomes possible to reduce the number of components in the optical pickup.

In the third embodiment, the polarization state of the optical beam is rotated once by the half wavelength plate 226. Alternatively, it is possible to concentrate the function of the half wavelength plate 226 to the half wavelength plate 13 and eliminate components. Furthermore, the solenoid has been mentioned as an example of the drive mechanism for moving the half wavelength plate 223. However, the drive mechanism is not necessarily restricted to the solenoid. A different configuration may also be used as long as the half wavelength plate 223 can be driven by external switch operation.

Fourth Embodiment

Figure 16:
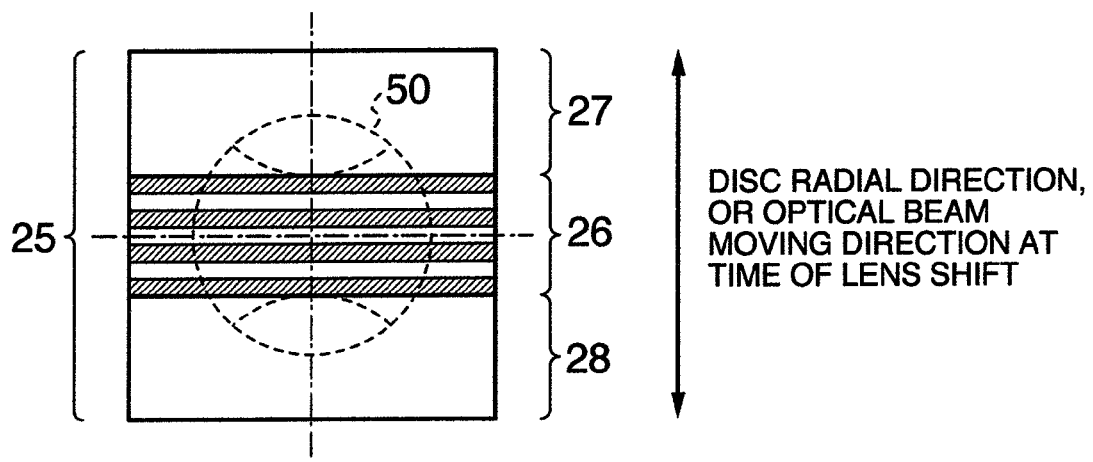
FIG. 16 is a diagram showing a pattern of a polarized grating in a fourth embodiment.
Figure 17:
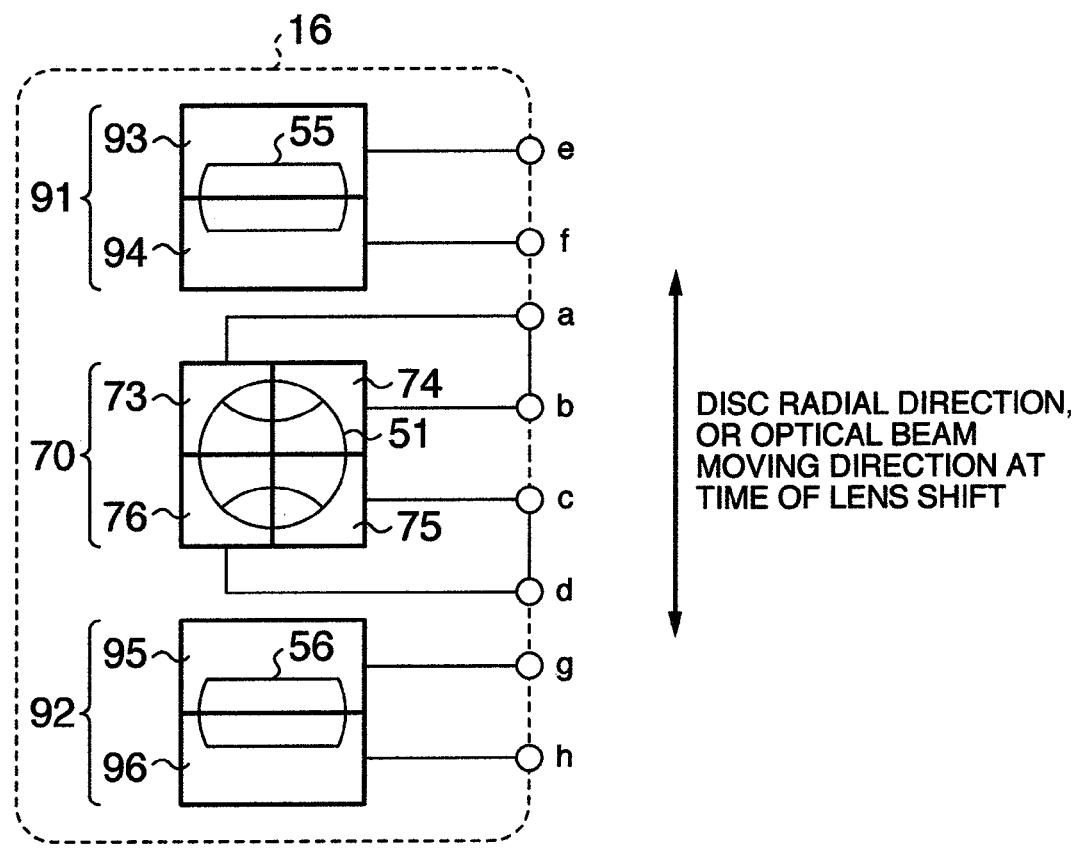
FIG. 17 is a diagram showing a light sensing face pattern of a photodetector in a fourth embodiment.

A fourth embodiment of the present invention will now be described with reference to FIGS. 16 and 17. FIG. 16 is a diagram showing a pattern of a polarized grating in the fourth embodiment. The component arrangement in the optical pickup in the fourth embodiment is the same as that shown in FIG. 1 and described earlier. The same light sensing face in the photodetector 16 are denoted by reference numerals like those shown in FIG. 7. In a central part of the surface of a polarized grating 25, a polarized grating region 26 is formed in a strip form in a direction perpendicular to the disc radial direction as shown in FIG. 16. Regions 27 and 28 having no grating grooves are formed with the polarized grating region 26 between. The polarized grating region 26 diffracts only S-polarized light approximately 100% and transmits P-polarized light approximately 100%. The polarized grating region 26 is set to have a width which does not extend to a region where the push-pull component of the optical beam 50 is generated. By using such a polarized grating, P-polarized light component of the optical beam 50 is transmitted in all regions. As for S-polarized light component of the optical beam 50, only a part incident on the polarized grating region 26 is diffracted and parts incident on the regions 27 and 28 having no grating grooves are transmitted.

A light sensing face pattern of the photodetector will now be described. FIG. 17 shows the light sensing face pattern of the photodetector 16 in the fourth embodiment. Three light sensing regions 70, 91 and 92 are formed on the photodetector 16. The light sensing region 91 and the light sensing region 92 are disposed in positions which are symmetrical to each other about the light sensing region 70. The component arrangement in the optical pickup in the fourth embodiment is the same as that shown in FIG. 1 and described earlier. As regards the same light sensing face in the photodetector, the same components are denoted by reference numerals like those shown in FIG. 7. FIG. 17 differs from FIG. 7 in that a light sensing region 91 and a light sensing region 92 are provided instead of the light sensing region 71 and the light sensing region 72 in positions irradiated with + first-order light 55 and − first-order light 56 diffracted by the polarized grating 25.

As for the light sensing region 70, its description will be omitted because it is the same as that shown in FIG. 7. The light sensing region 91 has a configuration in which two light sensing faces 93 and 94 are adjacent to each other as upper and lower faces. An output of the light sensing face 93 is output from a terminal e. An output of the light sensing face 94 is output from a terminal f. The light sensing region 92 has a configuration in which two light sensing faces 95 and 96 are adjacent to each other as upper and lower faces. An output of the light sensing face 95 is output from a terminal g. An output of the light sensing face 96 is output from a terminal h.

In the fourth embodiment, a vicinity of a center of the light sensing region 70 in the photodetector 16 is irradiated with an optical beam 51 of the zeroth-order light transmitted by the polarized grating 25 intact. A vicinity of a center of the light sensing region 91 is irradiated with the optical beam 55 of the + first-order light diffracted by the polarized grating 25. A vicinity of a center of the light sensing region 92 is irradiated with the optical beam 56 of the − first-order light.

A focusing error signal and a tracking error signal in the fourth embodiment can be generated by using a configuration similar to that in the first embodiment. Also in the combination configuration of the polarized grating and the photodetector as described with reference to the fourth embodiment, therefore, it is possible to implement an optical system configuration capable of coping with both the BD and the HD DVD by polarization changeover in the return trip in the same way as the first embodiment. As a matter of course, the pattern of the polarized grating and the shape of the light sensing face of the photodetector can be arbitrarily set in a different configuration as well, as long as the zeroth-order light and +− first-order light are made different in polarization state by the polarized grating and the photodetector subtracts an offset component from a push-pull signal.

Fifth Embodiment

An optical disc apparatus having an optical pickup according to one of the first to fourth embodiments mounted thereon will now be described. FIG. 18 shows a schematic block diagram of an optical disc apparatus having an optical pickup in the present embodiment mounted thereon. A part of a signal detected by an optical pickup 220 is sent to an optical disc discrimination circuit 121. Discrimination operation of the optical disc in the optical disc discrimination circuit 121 is conducted by comparing whether the substrate thickness of the optical disc is optimum for the selected object lens and the oscillation wavelength of the laser diode which is lit and utilizing the fact that for example, the focusing error signal amplitude level detected from the optical pickup 220 becomes large if the substrate thickness is suitable. Furthermore, in order to select an object lens, a switch 221 for a liquid crystal element drive circuit 230 is operated by an output of the liquid crystal element drive circuit 230. A result of the disc discrimination is sent to a control circuit 124. In addition, a part of the detected signal detected by the optical pickup 220 is sent to a servo signal generation circuit 122 or an information signal detection circuit 123. The servo signal generation circuit 122 generates a focusing error signal and a tracking error signal suitable for the optical disc 210 or 218 or the double-layered 22 from various signals detected by the optical pickup 220, and sends the focusing error signal and the tracking error signal to the control circuit 124. On the other hand, the information signal detection circuit 123 detects an information signal recorded on the optical disc 210 or 218 or the double-layered 22 from the detected signal of the optical pickup 220 and outputs the information signal to a played back signal output terminal. The control circuit 124 sets the optical disc 210 or 218 or the double-layered disc 22 on the basis of a signal from the optical disc discrimination circuit 121, and sends an object lens drive signal to an actuator drive circuit 125 on the basis of the focusing error signal and the tracking error signal generated by the servo signal generation circuit 122 so as to correspond to the optical disc 210 or 218 or the double-layered disc 22. The actuator drive circuit 125 drives the actuator 206 in the optical pickup 220 on the basis of the object lens drive signal to control the position of the object lens 7 or the object lens 216. Furthermore, the control circuit 124 exercises access direction position control on the optical pickup 220 by using an access control circuit 126, and exercises rotation control on a spindle motor 130 by using a spindle motor control circuit 127 to rotate the disc 210 or 218 or the double-layered disc 22. In addition, the control circuit 124 lights the laser diode 1 mounted on the optical pickup 220 suitably according to the optical disc 210 or 218 or the double-layered disc 22 by driving a laser lighting circuit 128 and implements recording and playback operation in the optical disc apparatus.

It is possible to constitute an optical disc playback apparatus by providing an information signal playback part which plays back an information signal from the signal output from the optical pickup and an output part which outputs a signal output from the information signal playback part. Furthermore, it is possible to constitute an optical disc recording apparatus by providing an information input part which inputs an information input part which inputs an information signal and a recording signal generation part which generates a signal to be recorded on an optical disc from information input from the information input part and outputs the signal to the optical pickup.

According to each of the above-described embodiments, one liquid crystal element, one liquid crystal element drive signal or one half wavelength plate can be used for both the changeover of the polarization state of the optical beam in the outward trip and the changeover of the polarization state of the optical beam in the return trip, as heretofore described. As a result, it is possible to reduce the number of components in the optical pickup, cope with optical discs of a plurality of kinds such as the BD and the HD DVD having no compatibility, and reduce the variation of the tracking signal in the double-layered disc.

By the way, the present invention is not restricted to the polarization direction in each of the above-described embodiments, but it is also possible to use P-polarized light on the BD side and use S-polarized light on the HD DVD side. The polarization state is not restricted to the present configuration.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup which emits light to a first and a second optical discs and which senses light reflected by the first and the second optical discs, the optical pickup comprising: a laser light source for emitting an optical beam; a first polarization rotation element capable of rotating and controlling a polarization direction of an optical beam emitted from the laser light source; an optical branching element disposed in a position after the first polarization rotation element when viewed from the laser light source, an incident optical beam being reflected or transmitted by the optical branching element according to a polarization state of the optical beam; a first object lens for focusing an optical beam reflected by the optical branching element onto the first optical disc; a second object lens for focusing an optical beam transmitted by the optical branching element onto the second optical disc; and a photodetector for sensing reflected light supplied from the first and the second optical discs, wherein a second polarization rotation element capable of rotating and controlling a polarization direction of the reflected light, is disposed in a position after reflection or transmission of the reflected light supplied from the first and second optical discs conducted by the optical branching element, said position being separated from an outgoing path, and wherein the polarization direction of one of a first optical beam returned from the first object lens and a second optical beam returned from the second object lens becomes substantially the same direction as the polarization direction of the other of said first and second optical beams after said one optical beam has been transmitted through the second polarization rotation element, wherein the first and second polarization rotation elements are constituted as one body.

2. An optical pickup which emits light to a first and a second optical discs and which senses light reflected by the first and the second optical discs, the optical pickup comprising: a laser light source for emitting an optical beam; a first polarization rotation element capable of rotating and controlling a polarization direction of an optical beam emitted from the laser light source; an optical branching element disposed in a position after the first polarization rotation element when viewed from the laser light source, an incident optical beam being reflected or transmitted by the optical branching element according to a polarization state of the optical beam; a first object lens for focusing an optical beam reflected by the optical branching element onto the first optical disc; a second object lens for focusing an optical beam transmitted by the optical branching element onto the second optical disc; and a photodetector for sensing reflected light supplied from the first and the second optical discs, wherein a second polarization rotation element capable of rotating and controlling a polarization direction of the reflected light, is disposed in a position after reflection or transmission of the reflected light supplied from the first and second optical discs conducted by the optical branching element, said position being separated from an outgoing path, and wherein the polarization direction of one of a first optical beam returned from the first object lens and a second optical beam returned from the second object lens becomes substantially the same direction as the polarization direction of the other of said first and second optical beams after said one optical beam has been transmitted through the second polarization rotation element, wherein the first and second polarization rotation elements are driven together by a polarization rotation element drive circuit which drives the polarization rotation element, wherein the first and second polarization rotation elements are constituted as one body.

3. An optical pickup which emits light to a first and a second optical discs and which senses light reflected by the first and the second optical discs, the optical pickup comprising: a laser light source for emitting an optical beam; a first polarization rotation element capable of rotating and controlling a polarization direction of an optical beam emitted from the laser light source; an optical branching element disposed in a position after the first polarization rotation element when viewed from the laser light source, an incident optical beam being reflected or transmitted by the optical branching element according to a polarization state of the optical beam; a first object lens for focusing an optical beam reflected by the optical branching element onto the first optical disc; a second object lens for focusing an optical beam transmitted by the optical branching element onto the second optical disc; and a photodetector for sensing reflected light supplied from the first and the second optical discs, wherein a second polarization rotation element capable of rotating and controlling a polarization direction of the reflected light, is disposed in a position after reflection or transmission of the reflected light supplied from the first and second optical discs conducted by the optical branching element, said position being separated from an outgoing path, and wherein the polarization direction of one of a first optical beam returned from the first object lens and a second optical beam returned from the second object lens becomes substantially the same direction as the polarization direction of the other of said first and second optical beams after said one optical beam has been transmitted through the second polarization rotation element, wherein the first and second polarization rotation elements are driven together by a polarization rotation element drive circuit which drives the polarization rotation element, wherein the first and second polarization rotation elements are constituted as one body; and a polarization rotation element drive circuit for driving the first or second polarization rotation element or both the first and second polarization rotation elements, wherein the polarization rotation element drive circuit is driven so as to correspond to the optical disc.

4. An optical pickup which emits light to a first and a second optical discs and which senses light reflected by the first and the second optical discs, the optical pickup comprising: a laser light source for emitting an optical beam; a first polarization rotation element capable of rotating and controlling a polarization direction of an optical beam emitted from the laser light source; an optical branching element disposed in a position after the first polarization rotation element when viewed from the laser light source, an incident optical beam being reflected or transmitted by the optical branching element according to a polarization state of the optical beam; a first object lens for focusing an optical beam reflected by the optical branching element onto the first optical disc; a second object lens for focusing an optical beam transmitted by the optical branching element onto the second optical disc; and a photodetector for sensing reflected light supplied from the first and the second optical discs, wherein a second polarization rotation element capable of rotating and controlling a polarization direction of the reflected light, is disposed in a position after reflection or transmission of the reflected light supplied from the first and second optical discs conducted by the optical branching element, said position being separated from an outgoing path, and wherein the polarization direction of one of a first optical beam returned from the first object lens and a second optical beam returned from the second object lens becomes substantially the same direction as the polarization direction of the other of said first and second optical beams after said one optical beam has been transmitted through the second polarization rotation element, wherein the first and second polarization rotation elements are constituted as one body; and a polarization rotation element drive circuit for driving the first or second polarization rotation element or both the first and second polarization rotation elements, wherein the polarization rotation element drive circuit is driven so as to correspond to the optical disc.

5. An optical pickup which emits light to an optical disc and which senses light reflected by the optical disc, the optical pickup comprising:

a laser light source for emitting an optical beam;

a first polarization rotation element capable of rotating and controlling a polarization direction of an optical beam emitted from the laser light source;

an optical branching element disposed in a position after the first polarization rotation element when viewed from the laser light source, an incident optical beam being reflected or transmitted by the optical branching element according to a polarization state of the optical beam;

a first object lens for focusing an optical beam reflected by the optical branching element onto a first optical disc;

a second object lens for focusing an optical beam transmitted by the optical branching element onto a second optical disc; and a photodetector for sensing reflected light supplied from the first and second optical discs, wherein the first polarization rotation element is moved to a position after reflection or transmission of the reflected light supplied from the first and second optical discs conducted by the optical branching element, and a polarization direction of the reflected light can be rotated and controlled.

6. An optical disc apparatus comprising:

the optical pickup according to claim 5; and a polarization rotation element drive circuit for driving the first polarization rotation element, wherein the polarization rotation element drive circuit is driven so as to correspond to the first or second optical disc.

* * * * *